July 6, 1926.
E. L. OLIVER ET AL
1,591,229
FILTER
Filed Nov. 5, 1921
3 Sheets-Sheet 1
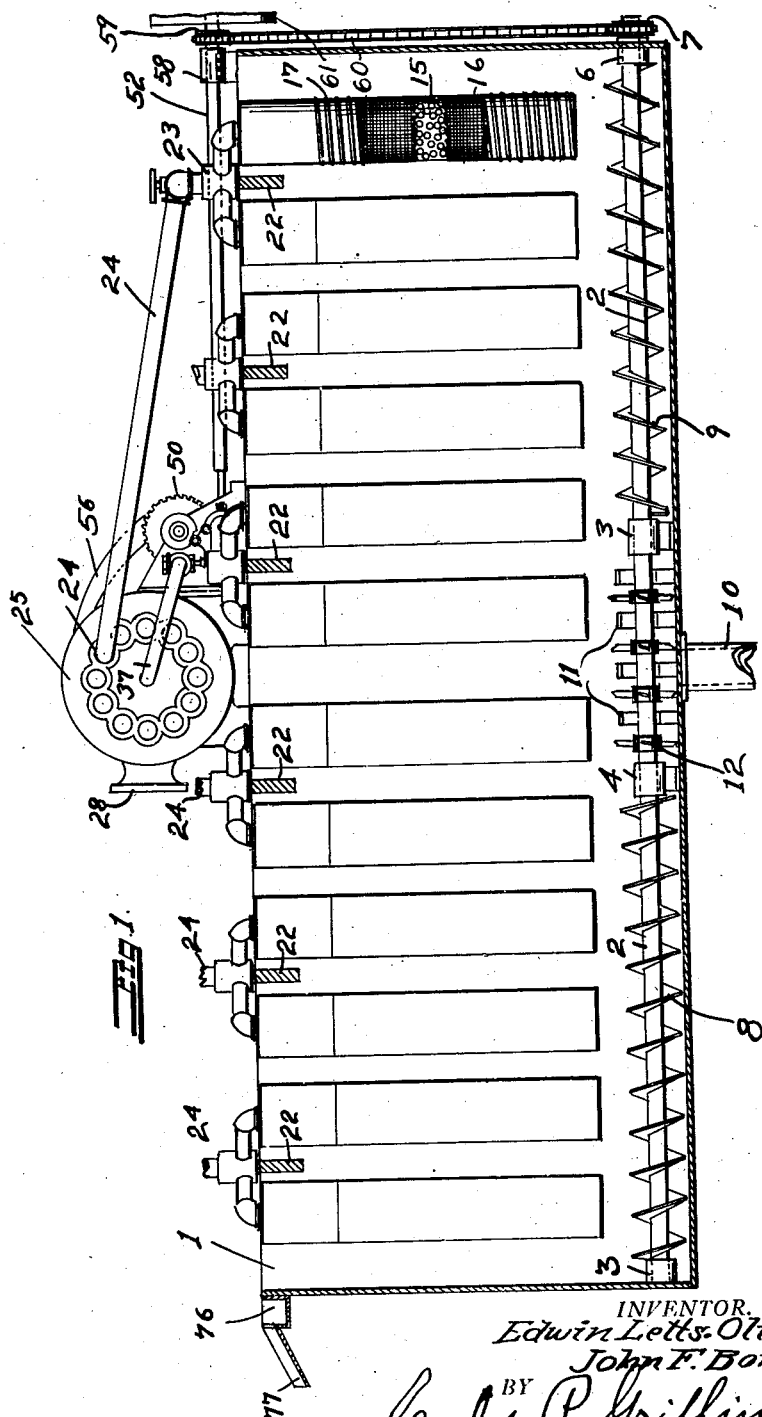
INVENTOR.
Edwin Letts Oliver.
John F. Borden
BY
Carlos P. Griffin
ATTORNEY.

July 6, 1926.
E. L. OLIVER ET AL
FILTER
Filed Nov. 5, 1921
1,591,229
3 Sheets-Sheet 2
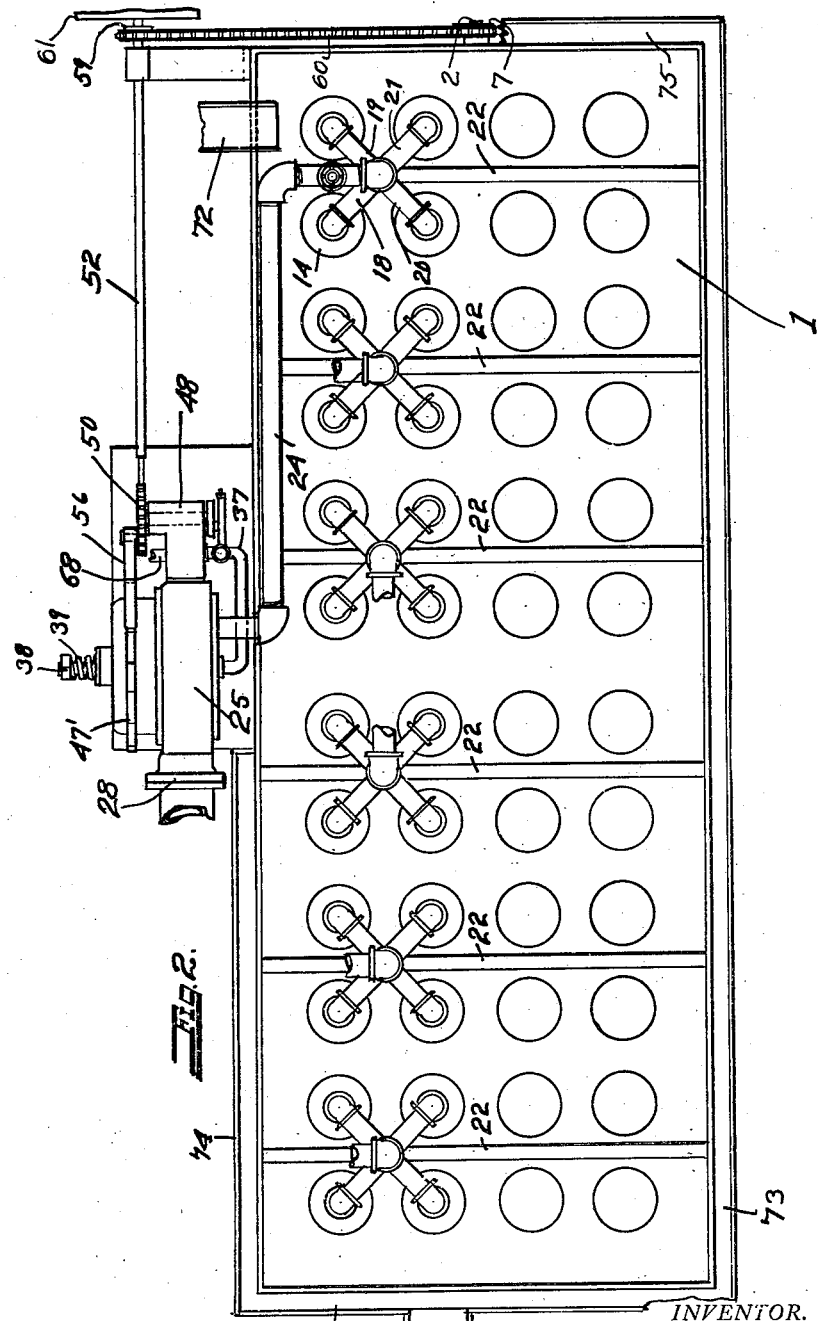
INVENTOR.
Edwin Letts Oliver.
John F. Borden.
BY Carlos P. Griffin
ATTORNEY.

July 6, 1926.
E. L. OLIVER ET AL
1,591,229
FILTER
Filed Nov. 5, 1921
3 Sheets-Sheet 3
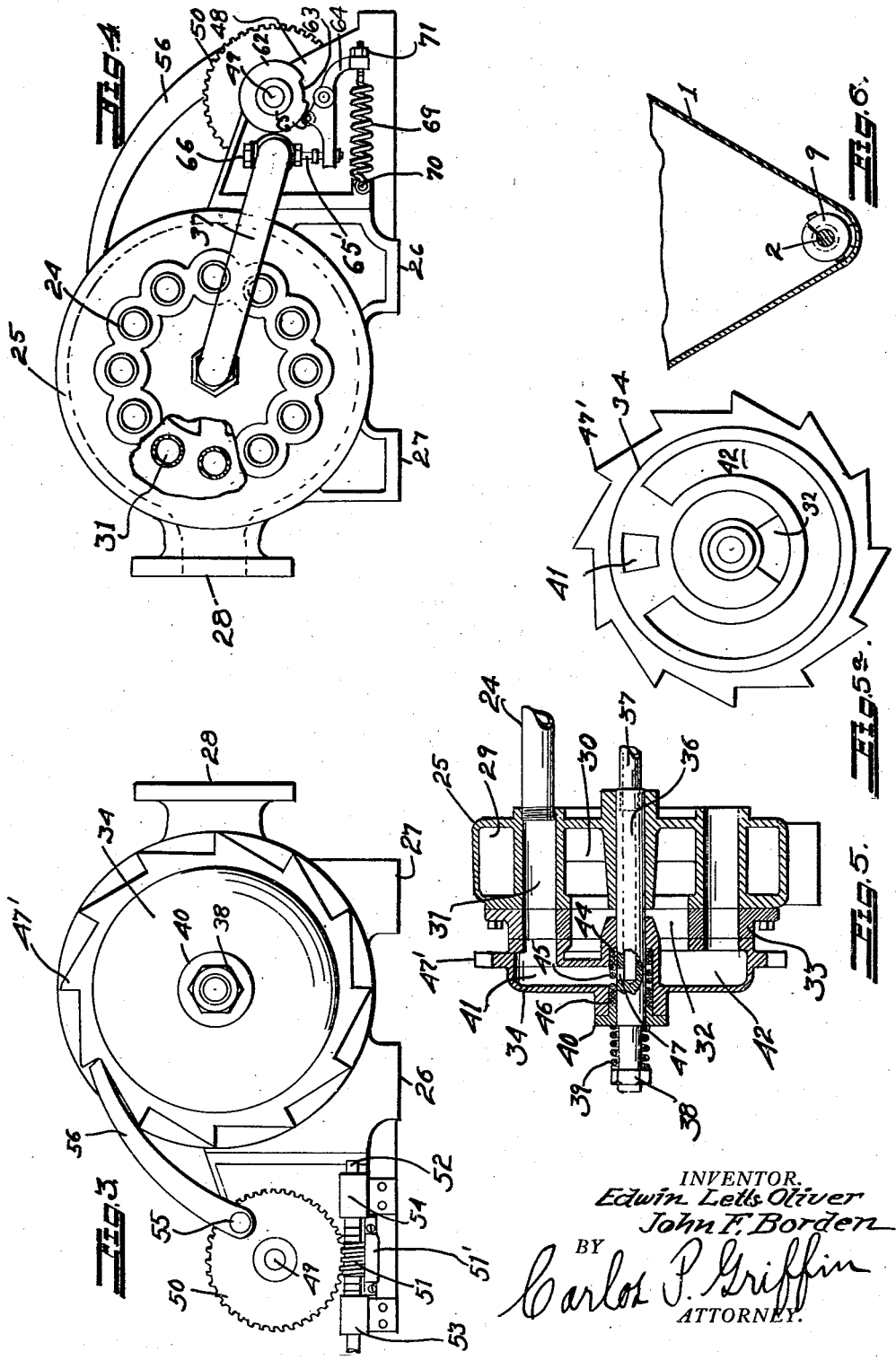

Patented July 6, 1926.

1,591,229

UNITED STATES PATENT OFFICE.

EDWIN LETTS OLIVER AND JOHN F. BORDEN, OF OAKLAND, CALIFORNIA.

FILTER.

Application filed November 5, 1921. Serial No. 513,065.

This invention relates to a filter of the combined vacuum and pressure type and its object is to produce a combined filter and settling tank which will be rapid and economical in operation.

A further object of the invention is to provide means whereby the cakes of filtered material produced upon the filter units will be discharged toward the center of the settling tank and more or less broken up before being finally discharged therefrom.

A further object of the invention is to provide the settling tank with an overflow whereby whatever liquid may overflow can either be treated separately if it has settled sufficiently, or can be returned to the filter tank for further treatment should that be required.

A further object of the invention is to provide an efficient and economical means for shifting the vacuum from one filter unit to the other and for shifting the air pressure from one filter unit to the other whenever a sufficiently heavy cake has been produced upon any given filter unit.

Another object of the invention is to provide means whereby the filter units will be given a sharp blast of air under pressure to relieve them throughout their length from the cake produced on the filtering media carried thereby, the filter units themselves being shaped with respect to their foraminous portions so as to supply a considerable volume of the filtrate to the foraminous surface whereby a reverse current is set up through the foraminous surface for a sufficient length of time to insure the complete removal from the foraminous surface of the cake produced.

Other objects of the invention will appear as the description proceeds.

An embodiment of the invention is shown in the accompanying drawings in which the same reference numeral is applied to the same portion throughout, but we are aware that there may be modifications thereof.

Fig. 1 is a vertical sectional view through the length of the settling tank showing the location of the filtering units therein.

Fig. 2 is a plan view of the complete apparatus.

Fig. 3 is a side elevation of the vacuum valve.

Fig. 4 is a side elevation of the vacuum valve looking from the opposite side of Figure 3.

Fig. 5 is a vertical sectional view of the vacuum valve.

Fig. 5ª is a side elevation of the vacuum valve looking from the inside, and

Fig. 6 is a transverse sectional view of a portion of the bottom of the settling tank.

The apparatus is mounted upon a long narrow tank 1 having a V-shaped bottom as indicated in Figure 6 in which there is a shaft 2, said shaft being mounted in bearings 3 to 6 inclusive, the latter of which is sufficiently tight to prevent the loss of liquid through the same in order to permit the shaft 2 to extend through the end of the tank to receive the sprocket wheel 7.

The shaft 2 carries oppositely pitched screw conveyors or breakers 8 and 9, and it is rotated in such a direction as will push the cakes dropped off the filter units toward the center discharge pipe 10. A plurality of prongs 11 are secured to the bottom of the tank near the center and the shaft carries a plurality of beaters 12 which serve to break up the particles of sludge and prevent them from lodging in the tank bottom.

The filter units consist of a plur pipes 14. These pipes are perforated for a portion of their length as indicated at 15, and are then covered with any suitable filtering media as indicated at 16 over which wire or twine windings 17 are placed to hold the filtering media securely in place.

The filter tubes 14 have the pipes 18 to 21 inclusive connected therewith in sets of four and the set of four filtering tubes is supported in each instance by a cross bar for each set of eight tubes as indicated at 22. The pipes 18 to 21 inclusive in each instance connect with a header or manifold 23 from which a pipe 24 extends to the vacuum valve casing 25. As there are twelve sets of filter units there are twelve sets of the pipes 24, and there are twelve holes in the vacuum valve casing 25 to receive said pipes.

The vacuum valve casing is supported by the two base flanges 26, 27, and it has a flange 28 for connection with the vacuum supply pipe. This valve is provided with an outer peripheral chamber 29 which is connected with an inner chamber 30 at intervals between the passageways 31 in order to allow the vacuum to reach the central opening 32 of the vacuum valve plate 33. This valve plate is bolted to the side of the valve casing 25, and the vacuum valve 34 revolves against the same.

The vacuum valve is supported by a stud shaft 36. This stud shaft is also connected with the air pressure pipe 37 at the back and having a nut 38 at the front bearing upon the spiral spring 39, said spiral spring holding the packing gland 40 in place against the valve hub. The valve has a passageway 41 and a chamber 42. The hub of the valve is cored out to receive a packing material at 44, a spiral spring 45 to hold said packing material in place, and a packing material 46.

The spiral spring 45 is heavy enough to hold the packing materials 44 and 46 apart and to provide means whereby the air blast passing from the opening 47 in the shaft 36 may always have access to the passageway 41.

The vacuum valve is provided with a series of pawl teeth 47', the number corresponding with the number of openings in the vacuum valve casing, so that with each movement of the vacuum valve a different pipe 24 will receive the blow from the air pressure tank, and the filter unit that has just received the blow from the air pressure tank will anew receive the vacuum and accumulate a fresh cake of the material being collected thereon.

At one side of the casing 25 there is a bearing 48 for a shaft 49. The shaft 49 carries a worm wheel 50 which is in mesh with a worm 51 on a shaft 52. The shaft 52 is journaled in two bearings 53, 54 carried by the base flange of the vacuum valve casing. The worm wheel 50 is also provided with a crank pin 55 which carries a pawl 56, and the throw of the pawl is arranged to be such that the vacuum valve will be rotated one step on each revolution of the shaft 49. Under the worm 51 there is an oil receptacle 51'.

The shaft 52 is also journaled in a bearing 58 at the end of the tank and it has a sprocket wheel 59 thereon around which the sprocket chain 60 passes to drive the conveyor shaft 2, power being received by a suitable pulley 61 on the end of the shaft 52.

On the end of the shaft 49 opposite from the worm wheel 50 there is a cam 62, said cam having a notch 63 therein. Pivotally mounted on the vacuum valve casing base below the cam 62 is an arm 64. This arm has a roller 65 which bears upon the cam 62, and it is arranged to contact with the stem 65' of a valve 66 on the air pressure pipe 37, said pipe extending into the vacuum valve casing base and having the air pressure supply pipe 68 connected to said base on the opposite side therefrom to the connection for the pipe 37.

A stiff spiral spring 69 is secured to the vacuum valve casing base flange 70 and passes through a hole in the lower end of the arm 64, a nut 71 being provided for adjusting the position of said spring upon said arm.

In order to supply the settling tank with material a launder 72 is provided at one end thereof and overflow launders 73, 74, 75, 76 and discharge launder 77 are provided around the sides of the settling tank.

In operation the material is supplied to the tank through the launder 72 and a pressure below atmospheric is applied to the vacuum valve casing. This causes the filtrate to pass through the fabric of the several filtering units and to pass through the vacuum valve casing to a suitable storage receptacle. At the same time the shaft 52 is operated and the vacuum valve 34 is intermittently rotated.

The space in the cam 63 is arranged to be as long or short as may be convenient, and is arranged to open the valve 66 a short time after the vacuum valve 34 has been moved from one position to another; thereupon the valve 66 is fully opened for a short period which causes a portion of the filtrate which has accumulated within the several filtering units connected to the particular unit being blown, to be forced back through the filtering unit with sufficient force to completely remove the cake formed on the outside of the same.

This object is attained because of the considerable quantity of filtrate contained in each filtering unit above the foraminous surface. As long as the filter is operated the filter valve is rotated to cause the cakes to be collected on and discharged from the several filtering units in rotation. As the material drops from the several filtering units it falls to the bottom of the tank and is pushed by the conveyors toward the center of the tank; whereupon the breakers 11 and 12 break it up sufficiently to insure it passing through the discharge pipe 10 conveniently. At the same time the filtering operations are taking place, the liquid may be overflowing the edge of the tank and may be either returned to this tank if not sufficiently settled for further filtering, or returned to a different tank for different treatment.

In the present specification a vacuum valve has been referred to for effecting the transfer of the filtrate from one side of the filter septum to the other, but it will be understood that the pressures used may be either above or below atmospheric as may be desired, the only requisite being a reversal of pressures on the filter septum.

What we claim is as follows, but various modifications may be made in the construction shown in the drawings and above particularly described form, within the purview of our invention:

1. An apparatus of the class described comprising a tank, a plurality of filtering units therein, a valve casing, pipes with open passages extending from the tops of the several filtering units to the valve casing, a valve adapted to rotate over the openings in the valve casing to which the pipes are connected, said valve also having a chamber to be connected with one of said openings, means to deliver periodically to the latter chamber a blast of fluid to force the cake off the several filtering units in succession, and means to intermittently rotate the valve.

2. An apparatus of the class described comprising a tank having an overflow, a plurality of depending filter units in said tank having imperforate upper portions and foraminous lower portions, a conveyor to collect in one portion of the tank the cakes discharged from the filter sections, a valve casing having a plurality of openings therein, pipes extending from the several filtering units to said valve casing, a valve having a chamber adapted to rotate over and cover several openings in the valve casing, said valve also having a chamber to cover only one of said openings, means to rotate the valve, means to intermittently supply said valve with fluid under pressure to clean the filter units successively, and means to discharge the collected pulp from the tank.

3. An apparatus of the class described comprising a tank, a plurality of depending filter units in said tank having top openings thereinto, each with an imperforate upper section, a conveyor to collect in one portion in the tank the cakes discharging from the filter, a valve casing having a plurality of openings, pipes extending from the several filtering units to said valve casing, a valve with openings adapted to pass over the openings in said valve casing, means to supply one of said valve openings with fluid under pressure intermittently to force the cake off the filter units in succession, and means to rotate the valve and a discharge for the collected pulp.

4. An apparatus of the class described comprising a tank, a plurality of depending filtering units, each having an imperforate upper section therein, means whereby the cake formed on the filtering units will be dropped into the tank, a screw conveyor to move the material to one portion of the tank, a discharge conduit connected to the tank and breakers for causing the material moved by the conveyor to the region of the discharge to be broken up and mixed with the material in the tank to produce a substantially uniform discharge.

5. An apparatus of the class described comprising a tank having an overflow, filtering units in said tank, means whereby the cake collected on the filtering units is discharged into the tank, a screw conveyor to collect in one portion of the tank the material discharged from the filtering units, breakers carried by the conveyor, and a discharge for removing the thickened pulp.

6. An apparatus of the class described comprising a plurality of filter units each filtering unit consisting of a depending tubular member having its upper portion airtight and its lower portion foraminous, a filtering medium surrounding the lower portion of the filtering unit, means surrounding the filtering medium to prevent it from being blown off the filter section and means to increase and diminish in rotation the pressures within the several tubes.

7. An apparatus of the class described comprising a tank having an overflow launder extending around the several sides thereof, a plurality of filter units therein, means to withdraw the fluid in the tank through the filter units in rotation collecting a cake thereon, means to reverse the flow of liquid through the filter unit to discharge the cake therefrom, a conveyor to collect the discharged cakes in one portion of the tank, breaker blades on the conveyor shaft, and a discharge below the breaker blades whereby a substantially uniform mixture is discharged.

8. An apparatus of the class described comprising a tank, means to supply said tank with fluid to be filtered, a plurality of filter units therein, movable means for reversing the flow of fluid through the filter units whereby a cake is alternately collected upon and discharged from the several filtering units in succession, a conveyor having breakers in the tank, and a discharge adjacent the breakers whereby a substantially uniform pulp is removed from the tank.

9. An apparatus of the class described comprising a tank having an overflow launder adjacent its top, a plurality of filter units therein, movable means to reverse the flow of fluid through the filter units to alternately collect and discharge a cake therefrom, a conveyor having breaker blades, a discharge adjacent the breaker blades whereby a substantially uniform mixture is withdrawn from the tank and means to operate the filter units in rotation.

In testimony whereof we have hereunto set our hands this 28th day of October A. D. 1921.

EDWIN LETTS OLIVER.
JNO. F. BORDEN.